United States Patent [19]

Goshy

[11] 3,842,348

[45] Oct. 15, 1974

[54] DEVICE FOR MONITORING EXCESS CURRENT USAGE BASED ON COULOMETRIC CELL

[76] Inventor: Allyn N. Goshy, 813 Queens Ln., Anoka, Minn. 55303

[22] Filed: Aug. 6, 1973

[21] Appl. No.: 385,888

[52] U.S. Cl............................ 324/94, 324/103 P
[51] Int. Cl....................... G01r 11/44, G01r 19/16
[58] Field of Search................. 324/103 R, 94, 182

[56] References Cited
UNITED STATES PATENTS 3,499,323  3/1970  Sturges ............................. 324/182
3,768,008  10/1973  Goshy ................................. 324/94

Primary Examiner—Alfred E. Smith
Attorney, Agent, or Firm—Robert E. Granrud

[57] ABSTRACT

Monitoring device for a power line including a voltage sensing means such as a zener diode for passing current whenever current on the power line exceeds a given threshold, thus causing an electro-plating coulometric cell to deplate to provide a measure of current usage above said threshold.

13 Claims, 3 Drawing Figures

3,842,348

DEVICE FOR MONITORING EXCESS CURRENT USAGE BASED ON COULOMETRIC CELL

FIELD OF THE INVENTION

This invention concerns a device for monitoring or metering electric current or power usage by a consumer above a given threshold.

BACKGROUND OF THE INVENTION

Electric power companies have long desired to induce consumers to shift heavy power consumption away from peak periods. This could be done by determining the approximate average power usage of each consumer and increasing the price of any power the consumer uses above that average during peak periods. Another incentive would be to give the consumer a discount for power consumed above that average during off hours.

The "excess-wattmeter" (or more precisely, excess watt-hour meter) of U.S. Pat. No. 1,175,508 (Burke) would be useful for this purpose, especially if operated in conjunction with a clocking device. Burke's "excess-wattmeter" measures power consumption above a preset threshold. By using a clock to activate the "excess-wattmeter" during peak periods, the consumer would be charged a given rate up to the threshold and a higher rate while consuming power beyond the threshold. Conceivably, a second excess watt-hour meter could be activated during periods of low power consumption, during which time the consumer would receive a discount for using more than the same or a different threshold of power. This would encourage the consumer to defer using equipment such as arc welders until periods of normally low system-wide power consumption. Like any electromechanical meter, Burke's excess-wattmeter requires precise tuning. If it has been used commercially, such usage has been rather obscure.

U.S. patent application Ser. No. 290,573, filed Sept. 20, 1972 by the present invention and another, now U.S. Pat. No. 3,768,008 discloses an electric meter which will eliminate manual meter reading. It includes a pair of electroplating coulometric cells which are sequentially deplated to indicate current usage. The consumer periodically removes a magazine containing the cells and takes it to an agency for replating. Upon the adoption of any such electric meter which eliminates manual reading, there will be a need for a device for metering excess current or power usage that, unlike Burke's, does not require manual meter reading.

THE PRESENT INVENTION

The device of the present invention provides a device for metering excess current or power usage such as that of Burke but of much more simple and economical construction and of far greater versatility. It is especially adapted for use in conjunction with the electric meter of the aforementioned Ser. No. 290,573 and when so used does not require manual meter reading. Furthermore, it can make use of circuitry already present in that electric meter including the current transformer on the power line being monitored and the associated rectifier. The output of the rectifier is connected to a voltage sensing device such as a zener diode or other gating means for passing current when the voltage at the rectifier output exceeds a predetermined level indicative of current usage on the power line exceeding a given threshold. Preferably there is circuitry between the rectifier and zener diode for permitting momentary surges of current in the power line (e.g., transients or motor startings) to pass before the full voltage at the rectifier output is applied to the zener diode.

Various means may be provided which are responsive to current flowing through the voltage sensing device to indicate current usage on the power line above a given threshold. In an embodiment of the present invention for use in conjunction with the electric meter of Ser. No. 290,573, a switching device activated by current flowing through a zener diode multiplies the current applied from the rectifier to the electroplating coulometric cells so that the cells are sequentially deplated either at a faster or slower rate depending upon whether the consumer is being penalized or rewarded for excess current usage.

By substituting for the zener diode a programed unijunction transistor coupled to a potentiometer, the voltage level at which the switching device is activated can be adjusted without changing any components.

Another embodiment of the invention which can be used with any electric meter employs an electroplating coulometric cell to which no current is normally applied and includes means for applying current to the coulometric cell in proportion to the flow of current through a zener diode. The degree of deplating of the cell provides a measure of current usage on the power line above the given threshold. If it is desired only to measure the duration of time that the current usage exceeds the threshold, a constant current may be applied to the coulometric cell only when the threshold of current usage is exceeded.

THE DRAWING

DESCRIPTION OF PREFERRED EMBODIMENTS

Figure 1:
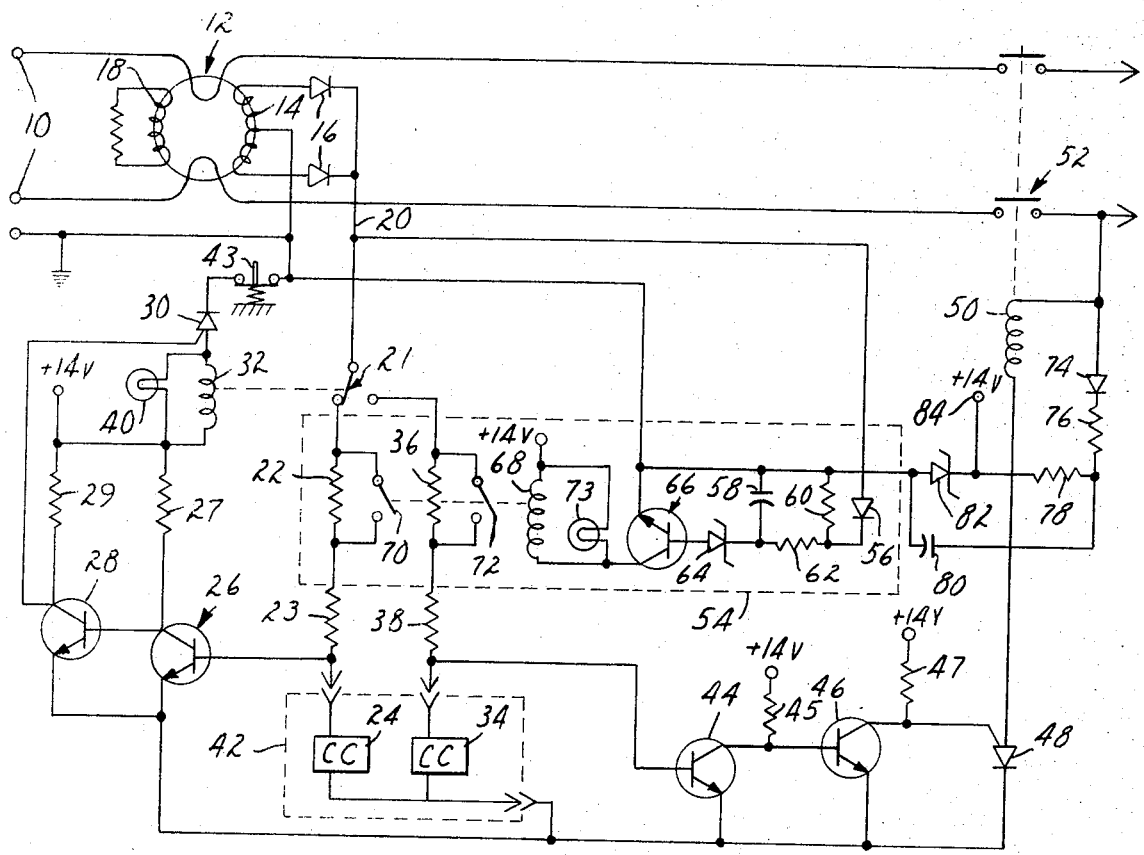
FIG. 1 is a circuit diagram of an electric meter of the type disclosed in the aforesaid application Ser. No. 290,573 incorporating a device for monitoring current usage on a power line above a given threshold in accordance with the present invention.

That portion of FIG. 1 which shows the electric meter of the aforementioned application Ser. No. 290,573 will first be described.

The hot leads 10 of a 220-volt AC power line are connected to single-turn primary windings on a current transformer 12 which has a linear response. A center-tap secondary winding 14 on the transformer is connected to a pair of germanium diodes 16 to provide a full-wave rectifier. Another secondary winding 18 provides a means for adjusting the response of the transformer 12. With each side of the secondary winding 14 having 275 turns, 0.3 volt is induced on the lead 20 for each ampere carried by the power line 10.

A magnetically operated reed switch 21, which is initially in the position shown, allows current to flow through resistors 22 and 23 to a first coulometric cell 24. When the cell 24 is deplated, the voltage rise biases a transistor 26 to conduction which in turn causes a transistor 28 to become nonconducting to apply gating current to a silicon controlled rectifier 30. This enables current to flow through a coil 32 around the reed switch 21 to connect the full-wave rectifier to a second coulometric cell 34 through resistors 36 and 38. The resistors 36 and 38 may be selected so that the same current at the leads 10 of the power line causes the cell 34 to deplate at approximately 10–15 times the rate that the cell 24 had been deplated.

The flow of current through the silicon controlled rectifier 30 upon deplating of the cell 24 illuminates a lamp 40, thus alerting the consumer to remove the cartridge 42 containing the cells 24 and 34 in favor of a freshly charged cartridge. The insertion of the fresh cartridge actuates a reset switch 43, whereupon the reed switch 21 returns to its original position. Should the consumer fail to change cartridges before the rapidly deplating cell 34 becomes fully deplated, transistors 44 and 46 become conducting to apply gating current to a silicon controlled rectifier 48. This enables current to flow through a coil 50 to open a circuit breaker 52 in the leads 10 of the power line. The circuit breaker remains open until the exhausted cartridge 42 is replaced.

The circuitry within the broken lines 54 of FIG. 1 monitors current usage on the power line above a given threshold. Connected to the lead 20 through a diode 56 are a capacitor 58 and resistors 60 and 62 which provide an integrating circuit to allow current surges of a few seconds duration to pass without being applied to a zener diode 64. The zener diode is selected to pass current when the voltage at its input reaches the level produced whenever the current usage on the power line exceeds the given threshold. For ordinary household use, a zener diode may be used which starts to conduct at about 36 volts (1N5258). The diode 56 prevents current from the capacitor 58 from flowing back through the lead 20 to the coulometric cells 24 or 34.

Any increase in load on the power line will charge the capacitor 58, and when the voltage across the capacitor reaches the predetermined level at which the current usage exceeds the given threshold, current flowing through the zener diode 64 causes a transistor 66 to become conducting. The resulting current through a coil 68 throws a pair of reed switches 70 and 72 so that current flowing to the coulometric cells 24 or 34 bypasses the resistors 22 and 36, respectively. This causes the active coulometric cell to deplate at a more rapid rate, thus penalizing the consumer for drawing current at a rate above the given threshold. When current is flowing through the coil 68, a lamp 73 lights to alert the consumer so that he can take steps to avoid further penalty. As soon as current is no longer passing through the coil 68, the switches 70 and 72 automatically reset to terminate the penalty.

The circuitry shown in FIG. 1 also includes a diode 74, two resistors 76 and 78, a capacitor 80 and a zener diode 82 which are selected to produce 14 volts DC at the contact 84 for use at indicated points in the circuitry of FIG. 1.

The circuitry of FIG. 1 has been successfully operated with the following components:

Diodes 16   1N34
Winding 18   275 turns
Resistor 22   30K
Resistor 23   270K
Coulometric cells 24, 34   Sprague "Koolometer" Type 12B
Transistors 26, 28, 44, 46, 66   MPS5172
Resistors 27, 45   100K
Resistors 29, 47   33K
Silicon controlled rectifiers 30, 48   2N2323
Resistor 36   3K
Resistor 38   27K
Lamp 40   47
Diode 56   1N4148
Capacitor 58   10μfd 50V
Resistor 60   100K
Resistor 62   220K
Diode 74   1N2070
Resistor 76   12 ohms
Resistor 78   15K
Capacitor 80   30μfd 150V DC
Zener diode 82   1N5258

Because power companies are faced with peak loads during the day and into the evening, a clocking device (not shown) may be added to activate the monitoring circuit 54 only during the peak periods. Alternatively or additionally, the clocking device may activate such a monitoring circuit only at periods of normally low power consumption, whereupon current usage on the power line above a given threshold would increase the resistance in the leads to the coulometric cells, thus giving the consumer a discount for shifting his peak power usage to periods of low demand. By employing two sets of reed switches in conjunction with a clocking device, the consumer may both be penalized for current usage above the threshold during peak periods and rewarded for current usage above the threshold during slack periods.

Figure 2:
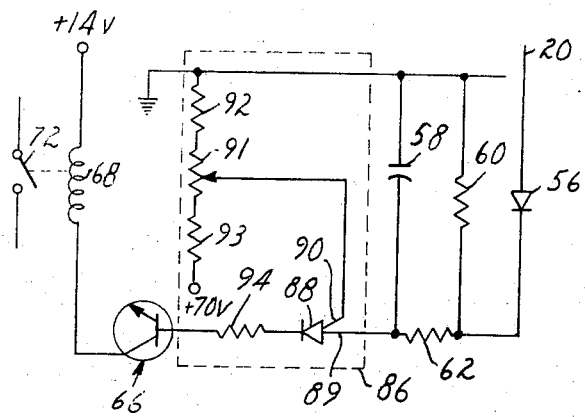
FIG. 2 shows an alternative voltage sensing device which may be substituted into the circuit of FIG. 1.

FIG. 2 of the drawing illustrates another circuit for monitoring current usage which differs from the monitoring device 54 of FIG. 1 only by substituting for the zener diode 64 the components within the dotted lines 86 comprising a programed unijunction transistor (PUT) 88 and a potentiometer 91. Whenever the potential at the anode 89 of the PUT exceeds the potential at its gate 90, the PUT conducts to activate the switch 72. Using a 2N6027 PUT with a 100K potentiometer, a resistor 92 of 330K, a resistor 93 of 220K and a resistor 94 of 3.9 ohms, the conducting voltage level can be adjusted from 35 to 46 volts.

Figure 3:
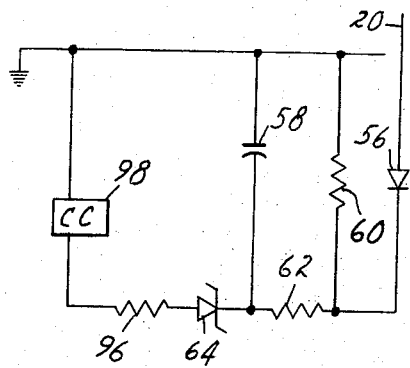
FIG. 3 shows a modification of the circuit of FIG. 1 whereby the monitoring device of the present invention directly measures current usage above a given threshold.

FIG. 3 of the drawing shows another circuit which may be substituted for the monitoring device 54 of FIG. 1, for monitoring current usage above a given threshold independently of the coulometric cells 24 and 34. Components of FIG. 3 are the same as the identically numbered components of FIG. 1, but the output of the zener diode 64 is applied through a resistor 96 to an additional coulometric cell 98 which preferably is mounted with the first two coulometric cells in the detachable cartridge 42. When the load on the power line draws current above the given threshold to cause the zener diode 64 to become conducting, the coulometric cell 98 deplates to provide a measurable indication of the excess current usage. The degree of deplating of the cell 98 is measured by the collection agency to whom the consumer takes the three-cell cartridge. By adding a switch plus a further coulometric cell controlled by a clocking device, the cell 98 could monitor excess current usage during peak periods for penalty calculation, and the further cell could monitor excess current usage during slack periods for discount calculation. The resistance 96 should be so selected in view of any consumer's power requirements that the coulometric cell or cells for monitoring excess current usage would never be fully deplated before complete deplating of the cells 24 and 34.

I claim:

1. A device for monitoring current usage above a given threshold comprising
   a current transformer having a primary winding for connection to a power line to be monitored,
   a rectifier including a winding on the transformer,
   gating means connected to the output of the rectifier for passing current when the voltage at the rectifier output exceeds a predetermined level,
   means responsive to said passing current for indicating current usage on the power line above the threshold, and
   an integrating circuit between the rectifier and the gating means for providing momentary delays during which current surges in the power line may pass without causing the gating means to become conducting.

2. A device for monitoring current usage as defined in claim 1 wherein said means for indicating current usage comprises an electroplating coulometric cell.

3. A device for monitoring current usage as defined in claim 1 wherein said gating means comprises a zener diode.

4. A device for monitoring current usage as defined in claim 1 and further comprising
   at least one electroplating coulometric cell, each of which has initially a known plating charge and is connected singly to the rectifier to apply current to one coulometric cell at a time to deplate the cell as a measure of current usage, and
   said means for indicating current usage includes switching means for multiplying the current applied to each said coulometric cell whenever current is flowing through the gating means.

5. A device for monitoring current usage as defined in claim 1 wherein said means for indicating current usage includes
   an electroplating coulometric cell which initially has a known plating charge, normally has no current applied thereto, and is deplated whenever current passes said gating means.

6. A device for monitoring current usage as defined in claim 1 and further comprising
   means for providing a perceptible indication whenever current is passed by said gating means.

7. In a device for metering current usage on a power line comprising a current transformer having a primary winding for connection to a power line to be metered, a full-wave rectifier including a center-tap secondary winding on the transformer, at least two electroplating coulometric cells, each of which initially has a known plating charge and experiences a sharp voltage rise upon deplating, and a switching device normally connecting only a first of said coulometric cells across the rectifier thorugh a first resistance, which switching device is responsive to the sharp voltage rise in the first coulometric cell for connecting only a second of said coulometric cells across the rectifier through a second resistance and for providing a perceptible indication thereof, the improvement comprising
   gating means connected to the output of the rectifier for passing current when the voltage at the rectifier output exceeds a predetermined level, and
   an additional switching device responsive to current passing said gating means for substituting for each said resistance a resistance which is a predetermined multiple thereof to apply the inverse multiple of the current to the connected coulometric cell whenever current is passing said gating means in order to penalize or reward the consumer in accordance with said inverse multiple when current usage on the power line exceeds a threshold above which the voltage at the rectifier output exceeds said predetermined level.

8. In a device for metering current usage as defined in claim 7, the further improvement comprising
   said gating means comprises a programmed unijunction transistor.

9. In a device for metering current usage as defined in claim 8, the further improvement comprising
   said programmed unijunction transistor is controlled through a potentiometer to permit ready adjustment of said threshold of current usage on said power line.

10. In a device for metering current usage on a power line comprising a current transformer having a primary winding for connection to a power line to be metered, a full-wave rectifier including a center-tap secondary winding on the transformer, at least two electroplating coulometric cells, each of which initially has a known plating charge and experiences a sharp voltage rise upon deplating, and a switching device normally connecting only a first of said coulometric cells across the rectifier, which switching device is responsive to the sharp voltage rise in the first coulometric cell for connecting only a second of said coulometric cells across the rectifier and for providing a perceptible indication thereof, the improvement comprising
    gating means connecting to the output of the rectifier for passing current when the voltage at the rectifier output exceeds a predetermined level,
    an additional coulometric cell which initially has a known plating charge and normally has no current applied thereto, and
    means responsive to said passing current for deplating said additional coulometric cell whenever current passes said gating means and including means for controlling the rate of said deplating such that the additional cell would never be fully deplated before complete deplating of said first and second coulometric cells, the deplating of said additional coulometric cell providing a basis for applying a discount or surcharge to the basic rate measured by said first and second coulometric cells.

11. In a device for metering current usage as defined in claim 10, the further improvement comprising
    all said coulometric cells are in a detachable cartridge.

12. In a device for metering current usage as defined in claim 10, the further improvement comprising
    said gating means comprises a zener diode which is connected to said additional coulometric cell to deplate the cell in proportion to the flow of current through the zener diode.

13. A device for monitoring current usage above a given threshold comprising a current transformer having a primary winding for connection to a power line to be monitored, a full-wave rectifier including a center-tap secondary winding on the transformer, gating means comprising a zener diode for passing current when the voltage at the rectifier output exceeds a predetermined level, a diode permitting current to flow only in the direction from the rectifier to the zener diode, an integrating circuit between said diode and said zener diode for providing a momentary delay during which current surges in the power line may pass without causing the zener diode to become conducting, and means responsive to said passing current for indicating current usage on the power line above the threshold.

* * * * *